(12) United States Patent
Bensilum et al.

(10) Patent No.: US 9,682,783 B2
(45) Date of Patent: Jun. 20, 2017

(54) PYLON FOR FIXING AN AIRCRAFT ENGINE HAVING UNDUCTED PUSHER PROPELLERS

(75) Inventors: Stéphane Emmanuel Daniel Bensilum, Alfortville (FR); Jean Bertucchi, Thiais (FR); Gaétan Jean Mabboux, Boulogne Billancourt (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/313,716

(22) Filed: Dec. 7, 2011

(65) Prior Publication Data

US 2012/0145824 A1    Jun. 14, 2012

(30) Foreign Application Priority Data

Dec. 8, 2010  (FR) ..................... 10 60272

(51) Int. Cl.
*B64D 27/08* (2006.01)
*B64C 21/04* (2006.01)
*B64D 27/12* (2006.01)
*B64D 27/00* (2006.01)

(52) U.S. Cl.
CPC .............. *B64D 27/08* (2013.01); *B64C 21/04* (2013.01); *B64D 27/12* (2013.01); *B64C 2230/28* (2013.01); *B64D 2027/005* (2013.01); *Y02T 50/166* (2013.01); *Y02T 50/66* (2013.01)

(58) Field of Classification Search
CPC ......... B64C 21/02; B64C 21/04; B64C 21/08; B64C 23/005; B64C 2700/6274; B64D 27/18; B64D 27/26; B64D 2027/262

USPC ................... 244/54, 55, 207, 208, 211–217; 248/554–557; 60/796, 797
See application file for complete search history.

(56) References Cited

U.S. PATENT DOCUMENTS

| | | | | |
|---|---|---|---|---|
| 3,055,614 | A * | 9/1962 | Thompson | 244/15 |
| 3,735,946 | A * | 5/1973 | Mullins | 244/54 |
| 3,841,588 | A * | 10/1974 | Arnold et al. | 244/207 |
| 4,026,500 | A * | 5/1977 | Grow | 244/36 |
| 4,682,746 | A * | 7/1987 | Thomas | 244/207 |
| 4,917,336 | A * | 4/1990 | Jacobs et al. | 244/207 |
| 4,966,338 | A * | 10/1990 | Gordon | 244/54 |
| 5,156,353 | A * | 10/1992 | Gliebe et al. | 244/54 |
| 5,791,601 | A * | 8/1998 | Dancila et al. | 244/207 |
| 6,142,425 | A * | 11/2000 | Armanios et al. | 244/207 |
| 6,554,229 | B1 * | 4/2003 | Lam et al. | 244/217 |
| 7,100,875 | B2 * | 9/2006 | Shmilovich et al. | 244/199.4 |
| 7,150,432 | B2 * | 12/2006 | Ouellette et al. | 244/53 B |
| 7,861,977 | B1 * | 1/2011 | Krol et al. | 244/207 |
| 7,984,879 | B2 * | 7/2011 | Cook et al. | 244/207 |
| 7,988,102 | B2 * | 8/2011 | Meister | 244/207 |
| 8,690,106 | B1 * | 4/2014 | Reissig | 244/208 |
| 8,714,477 | B2 * | 5/2014 | Rinjonneau et al. | 244/54 |
| 2006/0145027 | A1 * | 7/2006 | Warsop et al. | 244/207 |
| 2006/0226290 | A1 * | 10/2006 | Campbell | 244/123.1 |

(Continued)

*Primary Examiner* — Michael Wang
(74) *Attorney, Agent, or Firm* — Pillsbury Winthrop Shaw Pittman LLP

(57) ABSTRACT

A pylon for fixing an aircraft engine having unducted pusher propellers, the pylon ensuring the fixation of a propulsive system on the boattail of the aircraft, the pylon having a trailing edge, with an upper face and a lower face, for an airflow encountered by the pylon, wherein at least one of the two faces of the upper face and the lower face of the trailing edge is inclinable, at least in part.

13 Claims, 2 Drawing Sheets

(56) References Cited

U.S. PATENT DOCUMENTS

2011/0127374 A1\* 6/2011 Caballero Asensio
 et al. ............................. 244/65
2011/0135472 A1\* 6/2011 Cazals et al. .................. 416/23

\* cited by examiner

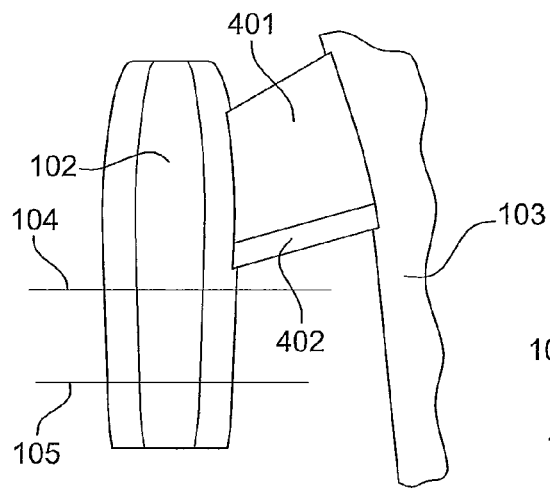
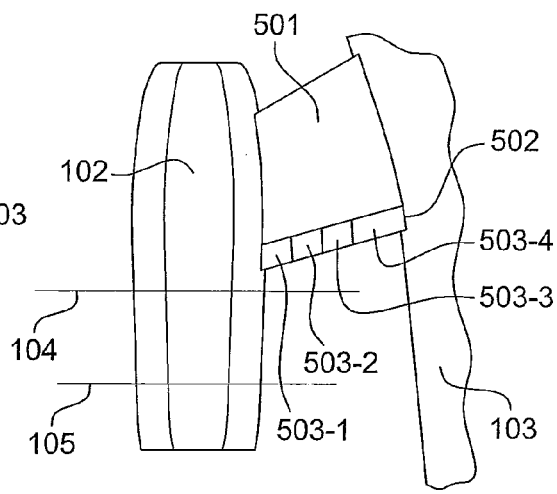
Fig. 4
Fig. 5
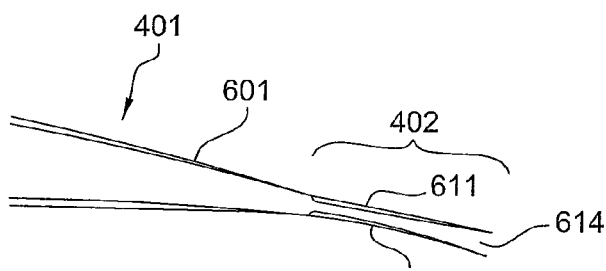
Fig. 6A
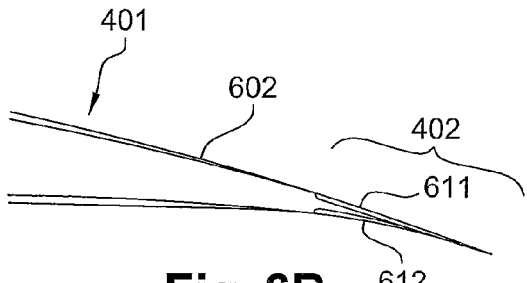
Fig. 6B
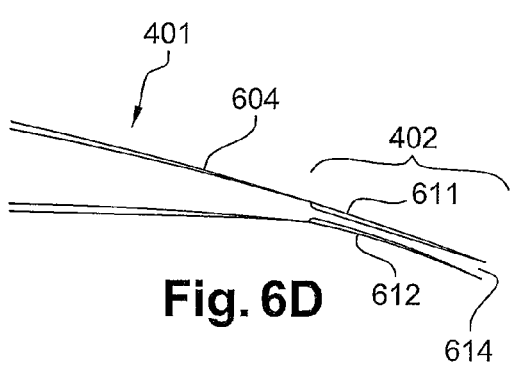
Fig. 6D
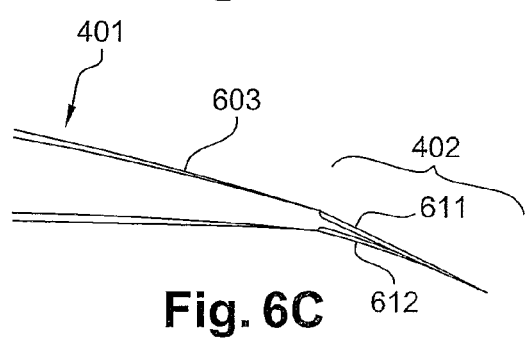
Fig. 6C
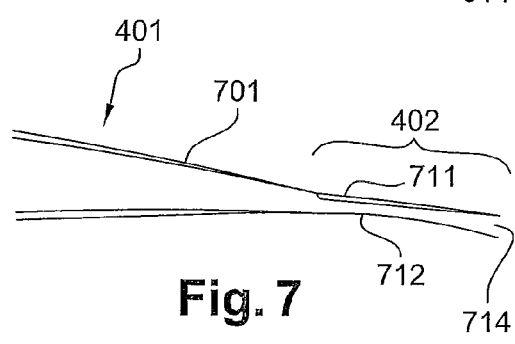
Fig. 7

PYLON FOR FIXING AN AIRCRAFT ENGINE HAVING UNDUCTED PUSHER PROPELLERS

CROSS REFERENCE TO RELATED APPLICATIONS

This application claims priority to French Patent Application No. 1060272, filed Dec. 8, 2010, the entire contents of all applications are incorporated herein by reference in their entireties.

TECHNICAL FIELD OF THE INVENTION

The present invention relates to a pylon for fixing an aircraft engine, in particular an aircraft engine having unducted pusher propellers (an "open-rotor pusher" or "pusher unducted fan").

The field of the invention is that of fixation structures between aircrafts and engines. Such structures are provided in particular in engines of the type having unducted pusher propellers, which comprise two contra-rotating turbines, each of which is fixed in rotation with at least one propeller situated outside the nacelle of the engine, the two propellers being arranged coaxially, one behind the other at the downstream end of the engine. The propulsive system is thus attached to the wing of the aircraft via means which make it possible to transfer to said wing the forces produced by the engine during the different operating modes thereof.

The attachment means of the propulsive system generally comprise a very robust and very heavy part called a pylon which is arranged between the wing of the aircraft and the engine. The pylon extends substantially in a plane passing through the longitudinal axis of the engine and comprises means for suspending the engine, through which means pass all the forces transferred between the engine and the aircraft.

Such a design is illustrated schematically in FIG. 1, which shows a plan view of a pylon 101 ensuring the connection between an engine 102, or propulsive system, of an aircraft, said engine 102 being of the type having unducted pusher propellers, and the boattail 103 (corresponding to the rear section) of said aircraft. As illustrated, the engine 102 comprises a first propeller 104 and a second propeller 105, ensuring the propulsion of the aircraft in a direction 106. In another variant to which the invention also relates, a single propeller is present; in this case reference is made to turboprops attached to the rear of the fuselage.

TECHNICAL BACKGROUND OF THE INVENTION

The use of aircraft engines having unducted pusher propellers inevitably leads to the appearance of a trail in the airflow encountered by the pylon 101, said trail being produced by the pylon 101 ensuring the structural connection between the aeroplane and the propulsive system and being destined to impact the propeller blades 104 and 105. This event is illustrated schematically in FIG. 2, in which a sectional view of the pylon 101 in its conventional or traditional design and a sectional view of the propeller 104 are shown; in this figure, the speed of the airflow is represented by arrows 201, of which the length is representative of the value of the speed at the point in question. Of course, it can be seen that the speeds at the points located in line with the pylon 101 are less significant than the speeds observed at the points where the airflow is not impacted by the presence of said pylon. These differences in speed give rise to a trail 202, formed by all the points for which the speed of the airflow is affected by the presence of the pylon 101 in the airflow.

The existence of this trail has a number of disadvantageous consequences:
  it has a negative effect on performance in terms of fuel consumption;
  it has a negative impact on noise level since it constitutes an additional source of noise, this source of noise being particularly bothersome at the moment of take-off of the aeroplane or during the phase of approach of the aircraft;
  it has a negative impact in terms of mechanics and vibration by creating an additional source of excitation.

The prior art proposes solutions to try to minimise the impact of the trail created by the pylon on the blades of the propellers. These solutions include that illustrated schematically in FIG. 3, in which a specific pylon profile 301 has been proposed. The special feature of the profile 301 lies in the shape of its trailing edge 302, which has been truncated compared to a conventional profile of the type visible in FIG. 2. The trailing edge 302 thus has an aperture 303 which is used to blow out the pulsed air 304 at said trailing edge 302. The air thus blown out makes it possible to reduce and even make up for the deficit in speed at different points of the trail of air produced by the presence of the pylon 301, this deficit in speed being illustrated in FIG. 2. To this end, the aperture 303 is fed with pressurised air, for example via a nozzle of the aircraft, which air is depressurised until reaching ambient pressure, thus making it possible to obtain a blow-out.

However, this solution presents a drawback linked to the truncated shape of the trailing edge. Such a shape is detrimental because it increases the shape of the above-mentioned trail when the air is not blown out via the aperture. For reasons of fuel consumption, it is not conceivable to maintain the blow-out during all phases of flight. Thus, although the proposed solution is satisfactory during specific phases such as the take-off or approach of the aeroplane, which are phases of relatively short duration during which the blow-out limits the negative impact, in terms of noise and vibration, of the trail produced by the presence of the pylon in front of the engine propellers, it presents a problem in terms of performance during the rest of the flight owing to the truncated shape of the profile of the pylon.

GENERAL DESCRIPTION OF THE INVENTION

The subject of the invention provides a solution to the problem just described by proposing a pylon of specific design making it possible to limit the detrimental effects of the trail caused by the presence of the pylon and of the positioning of the pylon in relation to the propellers of the aircraft engine having unducted pusher propellers whilst limiting fuel consumption, which is increased during certain phases of flight.

To do this, the present invention proposes the use of a pylon of which the trailing edge has a shape which can change over time according to the current phase of flight whilst being able to blow out the pulsed air during certain phases of flight.

The invention therefore basically relates to a pylon for fixing an aircraft engine having unducted pusher propellers, said pylon ensuring the fixation of a propulsive system on the boattail of the aircraft, said pylon having a trailing edge, with an upper face and a lower face, for an airflow encountered by the pylon and characterised in that at least one of the two faces of the upper face and the lower face of the trailing edge is inclinable, at least in part.

In addition to the primary features which have just been mentioned in the paragraph above, the pylon according to the invention may have one or more of the following additional features, considered individually or in any technically feasible combination:
- the pylon has a first state, called the open state, in which the trailing edge has an aperture at one end of the upper and lower faces, said aperture being able to allow the pulsed air to escape, and a second state, called the closed state, in which said end does not have an aperture, the switch from the first state to the second state being ensured by varying the inclination of the upper face and/or of the lower face of the trailing edge;
- the upper face and the lower face of the trailing edge of the pylon are inclinable;
- the upper face and the lower face are inclinable together whilst maintaining the open state;
- the upper face and the lower face are inclinable together whilst maintaining the closed state;
- each inclinable face of the trailing edge has a length between 5 and 25% of the total length of the chord of the pylon;
- each inclinable face of the trailing edge has a plurality of inclinable panels arranged side-by-side over the width of the trailing edge;
- each inclinable face of the trailing edge is able to have an angle of inclination reaching 50° to the chord of said pylon.

In accordance with another aspect, the invention relates to an aircraft comprising the pylon according to the invention.

The invention and its different applications will be better understood upon reading the following description and examining the accompanying drawings.

BRIEF DESCRIPTION OF THE DRAWINGS

The drawings are given merely by way of example and are in no way intended to limit the invention. In the drawings:

FIG. 4 is a schematic view of a first example of a pylon according to the invention, and of its environment;

FIG. 5 is a schematic view of a second example of a pylon according to the invention, and of its environment;

FIGS. 6-A to 6-D are schematic views of different designs of an example of a profile of a pylon according to the invention;

FIG. 7 is a schematic view of another example of a profile of a pylon according to the invention.

DETAILED DESCRIPTION OF AT LEAST ONE EMBODIMENT OF THE INVENTION

Figure 1:
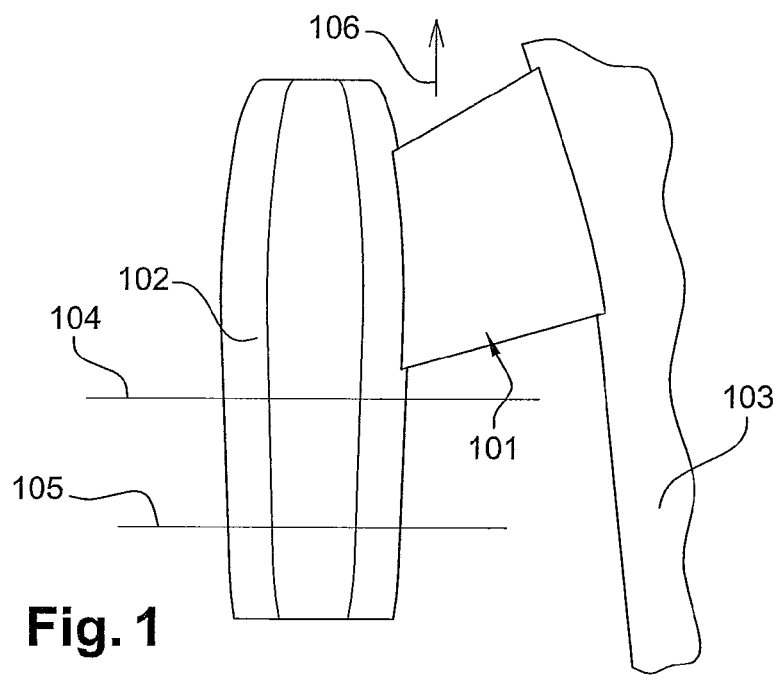
FIG. 1, which has already been described, is a schematic view of a pylon of the prior art and of its environment.
Figure 2:
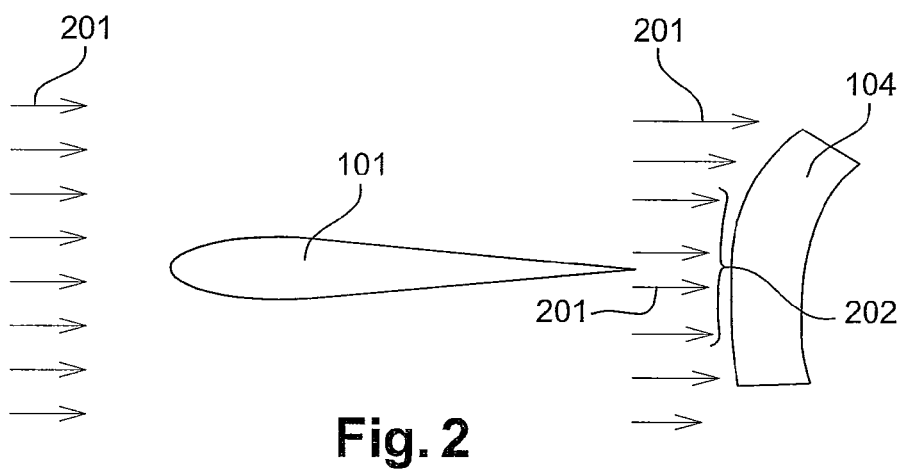
FIG. 2, which has also already been described, is a schematic view of the stresses to which the propellers of aircraft engines having unducted pusher propellers are likely to be subjected owing to the existence of a trail in the airflow produced by the positioning of the pylon.
Figure 3:
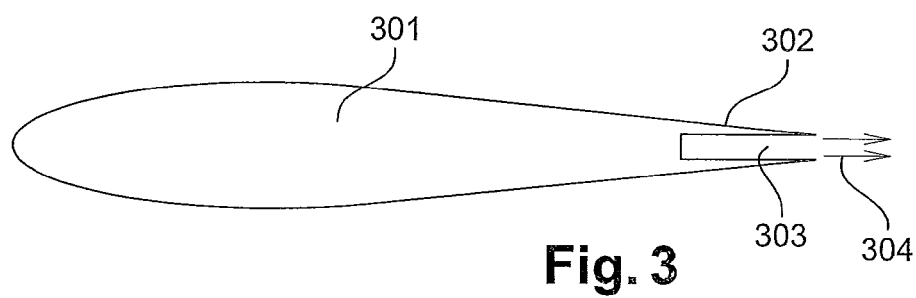
FIG. 3, which has also already been described, is a schematic view of a pylon profile used in the prior art to pulse the air.

Unless specified otherwise, any like element shown in different figures has a single reference.

FIGS. 4 and 5 show a first example and a second example respectively of a pylon according to the invention in its preferred operational environment, that is to say aircraft engines having unducted pusher propellers.

These figures show a schematic plan view of a pylon 401 and of a pylon 501 respectively, ensuring the connection between the propulsive system 102 with its first propeller 104 and its second propeller 105, and the boattail 103 of an aircraft. The pylon 401 has a trailing edge 402 which corresponds to the last zone of the pylon over which the airflow encountered by the pylon 401 passes.

In the invention it is proposed to make the trailing edge inclinable 402. "Inclinable trailing edge" means that the trailing edge 402 is movable and may have different angles of inclination to a horizontal plane, either with consideration of the trailing edge over its entire thickness, or with consideration individually of its upper face or lower face, as can be seen in the various figures which will be discussed in detail below. According to the invention, the trailing edge is inclinable at least in part, that is to say the inclinable section may extend over the entire width of the pylon 401, as shown in FIG. 4,—the width of the pylon corresponding to the side extending from the engine 102 to the boattail 103—or else that the inclinable section represents merely a portion of the width of the pylon 401.

In a specific embodiment illustrated in FIG. 5, the pylon 501 according to the invention has a trailing edge 502 formed of a side-by-side arrangement of panels 503-1, 503-2, 503-3 and 503-4 which are inclinable independently of one another. The angle of inclination may thus vary over the width of the trailing edge 502, which allows greater accuracy when correcting the trail caused by the presence of the pylon 501.

FIGS. 6-A to 6-D show different designs of the trailing edge of a first example of a pylon according to the invention, said designs being obtained as a result of the inclinable nature of the trailing edge 402, which has, in these examples, an upper face 611 and a lower face 612 which are both inclinable, advantageously independently of one another.

FIG. 6-A and FIG. 6-D show, respectively, a first design 601 and a second design 604 of the trailing edge 402, in which the free ends of the upper 611 and lower 612 faces are spaced apart and thus form an opening 614, via which the blown-out air can be pulsed. The second design 604 has a greater inclination compared to the inclination of the first design 601. The first configuration is switched to the second configuration by advancing the inclination of the upper 611 and lower 612 faces, for example simultaneously so as to retain the same flow of pulsed air during the phase of movement of the trailing edge 402.

Comparatively, FIG. 6-B and FIG. 6-C show, respectively, a third design 602 and a fourth design 603 of the trailing edge 402, in which the free ends of the upper 611 and lower 612 faces are in contact and therefore no longer form an aperture. The third design 602 has a greater inclination compared to the fourth design 603. The third design 602 is switched to the fourth design 603 by advancing the inclination of the upper 611 and lower 612 faces, for example simultaneously, so as to retain a profile of the trailing edge 402 which is as thin as possible during the phase of movement of the trailing edge 402.

In the example shown in FIG. 7, a second example of a pylon 701 according to the invention has an inclinable upper face 711, whereas the lower face 712 of the trailing edge 402 is not inclinable. The reverse design, with a lower face which is inclinable and an upper face which is not inclinable also constitutes an alternative embodiment of pylons according to the invention. In such an embodiment, even if the trailing edge cannot be oriented in its entirety, it is still possible to form a cavity 714 at the end of the trailing edge 402, via which the pulsed air can be blown out.

According to the embodiments, the inclinable section of the trailing edge of the pylons according to the invention varies between 10 and 20% of the length of the chord of the pylon in question, the length of the chord corresponding to the length of the pylon at its point of contact with the engine 102. Advantageously, the inclination of the inclinable sections (upper face and/or lower face) may vary between less than 50° and more than 50° to the horizontal.

Thus, as a result of the pylons according to the invention, a variability of the trailing edge of the pylon is introduced which makes it possible to blow out the pulsed air during certain phases of flight (take-off, approach phase) by creating an aperture at the end of the pylon, which has the positive effect of limiting the detrimental effects of the trail in the airflow reaching the propellers, whilst still retaining the possibility to re-close said aperture when the blow-out is not used so as to re-form a pylon profile having a thin end, which is less detrimental in terms of consumption.

Advantageously, the pylons according to the invention make it possible to obtain different pylon profiles in open mode and closed mode, thus making it possible to modify an angle of attack of the airflow over the propellers of the aircraft engine having unducted pusher propellers, irrespectively of whether or not the air is blown out.

The invention claimed is:

1. A pylon for fixing an aircraft engine having unducted pusher propellers, said pylon ensuring fixation of a propulsive system on a boattail of an aircraft, said pylon comprising:
   a first end for connecting to the aircraft engine;
   a second end for connecting to the boattail of the aircraft; and
   a trailing edge, with an upper face and a lower face, for an airflow encountered by the pylon, the upper face or the lower face of the trailing edge being inclinable, at least in part, the trailing edge corresponding to a last zone of the pylon over which the airflow encountered by the pylon passes,
   wherein the pylon has a first state, corresponding to a first flight phase of the aircraft that is a take-off phase or an approach phase, or both, in which the trailing edge has an aperture at one end of the upper and lower faces for different pylon profiles, said aperture being able to allow a pulsed air to escape towards the unducted pusher propellers, and a second state, corresponding to a second flight phase of the aircraft that is different from the first flight phase, in which said ends of the upper and lower faces are in contact with each other so that the aperture is closed for different pylon profiles, a switch from the first state to the second state or a change of pylon profiles being ensured by varying the inclination of the upper face and/or the lower face of the trailing edge, to affect the airflow towards the unducted pusher propellers of the aircraft engine,
   wherein the different pylon profiles of the first and second states are configured to modify an angle of attack of the airflow over the unducted pusher propellers, and
   wherein the pylon extends substantially in a plane passing through a longitudinal axis of the aircraft engine and is configured to fix the aircraft engine to the boattail of the aircraft.

2. The pylon according to claim 1, wherein the upper face and the lower face of the trailing edge of the pylon are inclinable.

3. The pylon according to claim 1, wherein each inclinable face of the trailing edge has a length between 5 and 25% of a total length of a chord of the pylon.

4. The pylon according to claim 1, wherein each inclinable face of the trailing edge is able to have an angle of inclination reaching 50° to a chord of said pylon.

5. An aircraft, comprising the pylon according to claim 1.

6. The pylon according to claim 1, wherein the trailing edge comprises more than one panel along its width, and wherein at least one of the panels has the upper face or the lower face of the trailing edge that is inclinable, at least in part.

7. The pylon according to claim 1, wherein, in said first state, said aperture has a dimension that extends from an extremity of the upper face arranged at said end of the upper and lower faces to an extremity of the lower face arranged at said end of the upper and lower faces.

8. A pylon for fixing an aircraft engine having unducted usher propellers, said pylon ensuring fixation of a propulsive system on a boattail of an aircraft, said pylon comprising:
   a first end for connecting to the aircraft engine;
   a second end for connecting to the boattail of the aircraft; and
   a trailing edge, with an upper face and a lower face, for an airflow encountered by the pylon, the upper face or the lower face of the trailing edge being inclinable, at least in part, the trailing edge corresponding to a last zone of the pylon over which the airflow encountered by the pylon passes,
   wherein the pylon has a first state, corresponding to a first flight phase of the aircraft that is a take-off phase or an approach phase, or both, in which the trailing edge has an aperture at one end of the upper and lower faces for different pylon profiles, said aperture being able to allow a pulsed air to escape towards the unducted pusher propellers, and a second state, corresponding to a second flight phase of the aircraft that is different from the first flight phase, in which said ends of the upper and lower faces are in contact with each other so that the aperture is closed for different pylon profiles, a switch from the first state to the second state or a change of pylon profiles being ensured by varying the inclination of the upper face and/or the lower face of the trailing edge, to affect the airflow towards the unducted pusher propellers of the aircraft engine,
   wherein the different pylon profiles of the first and second states are configured to modify an angle of attack of the airflow over the unducted pusher propellers, and
   wherein the pylon extends substantially in a plane passing through a longitudinal axis of the aircraft engine and is configured to fix the aircraft engine to the boattail of the aircraft,
   wherein each inclinable face of the trailing edge has a plurality of inclinable panels arranged side-by-side over a width of the trailing edge.

9. A pylon for fixing an aircraft engine to an aircraft, the pylon comprising:
   a first end for connection to the aircraft engine;
   a second end for connection to a boattail of the aircraft; and
   a trailing edge, with an upper face and a lower face, for an airflow encountered by the pylon, the upper face and/or the lower face of the trailing edge being inclinable, at least in part, the trailing edge corresponding to a last zone of the pylon over which the airflow encountered by the pylon passes, wherein the pylon has a first state, corresponding to a first flight phase of the aircraft that is a take-off phase or an approach phase, or both, in which the trailing edge has an aperture at one end of the upper and lower faces for different pylon profiles, said aperture being formed between ends of the upper and lower faces that are spaced relatively apart from each other which are able to allow a pulsed air to escape towards unducted pusher propellers of the aircraft engine, and a second state, corresponding to a second flight phase of the aircraft that is different from the first flight phase, in which the ends of the upper and lower faces are in contact with each other such that said aperture is closed for different pylon profiles, a switch from the first state to the second state or a change of pylon profile being ensured by varying the inclination of the upper face and/or the lower face of the trailing edge, to affect the airflow towards unducted pusher propellers of the aircraft engine, wherein the different pylon profiles of the first and second states are configured to modify an angle of attack of the airflow over the unducted pusher propellers, and wherein the pylon extends substantially in a plane passing through a longitudinal axis of the aircraft engine and is configured to fix the aircraft engine to the boattail of the aircraft.

10. The pylon according to claim 9, wherein, in said first state, said aperture has a dimension that extends from an extremity of the upper face arranged at said end of the upper and lower faces to an extremity of the lower face arranged at said end of the upper and lower faces.

11. An aircraft comprising:
a pylon;
an aircraft engine having propeller blades; and
a boattail,
wherein the pylon comprises a first end for connection to the aircraft engine and a second end for connection to the boattail, the pylon extending substantially in a plane passing through a longitudinal axis of the aircraft engine,
wherein the pylon further comprises a trailing edge formed by an upper and lower face, the trailing edge being positioned upstream relative to the propeller blades, and the trailing edge containing more than one panel on its upper face and/or its lower face between the first end and the second end of the pylon, the trailing edge corresponding to a last zone of the pylon over which the airflow encountered by the pylon passes,
wherein at least one of the panels of the more than one panel of the trailing edge is moveable relative to a horizontal plane through the pylon, wherein each moveable panel is independently adjustable to affect airflow towards the propeller blades of the aircraft engine, and
wherein each movable panel is movable between a first state, corresponding to a first flight phase of the aircraft that is a take-off phase or an approach phase, or both, and a second state, corresponding to a second flight phase of the aircraft that is different from the first flight phase, to affect the airflow towards the propeller blades of the aircraft engine, the first state resulting in at least part of the upper and lower faces in the trailing edge being spaced relatively apart from each other forming an aperture between at least part of the upper and lower faces for different pylon profiles, and the second state comprising the upper and lower faces in contact with each other so that the aperture is closed for different pylon profiles, and wherein the different pylon profiles of the first and second states are configured to modify an angle of attack of the airflow over the propeller blades.

12. The aircraft according to claim 11, wherein said at least one of the panels of the more than one panel of the trailing edge is moveable relative to a horizontal plane through the pylon to create an aperture at an end of the upper and lower faces of the trailing edge, said aperture having a dimension that extends from an extremity of the upper face arranged at said end of the upper and lower faces to an extremity of the lower face arranged at said end of the upper and lower faces.

13. An aircraft comprising:
a pylon;
an aircraft engine having propeller blades; and
a boattail,
wherein the pylon comprises a first end for connection to the aircraft engine and a second end for connection to the boattail, the pylon extending substantially in a plane passing through a longitudinal axis of the aircraft engine,
wherein the pylon further comprises a trailing edge formed by an upper and lower face, the trailing edge being positioned upstream relative to the propeller blades, and the trailing edge containing more than one panel on its upper face and/or its lower face between the first end and the second end of the pylon, the trailing edge corresponding to a last zone of the pylon over which the airflow encountered by the pylon passes,
wherein at least one of the panels of the more than one panel of the trailing edge is moveable relative to a horizontal plane through the pylon, wherein each moveable panel is independently adjustable to affect airflow towards the propeller blades of the aircraft engine, and
wherein each movable panel is movable between a first state, corresponding to a first flight phase of the aircraft that is a take-off phase or an approach phase, or both, and a second state, corresponding to a second flight phase of the aircraft that is different from the first flight phase, to affect the airflow towards the propeller blades of the aircraft engine, the first state resulting in at least part of the upper and lower faces in the trailing edge being spaced relatively apart from each other forming an aperture between at least part of the upper and lower faces for different pylon profiles, and the second state comprising the upper and lower faces in contact with each other so that the aperture is closed for different pylon profiles, and wherein the different pylon profiles of the first and second states are configured to modify an angle of attack of the airflow over the propeller blades, wherein each panel on the upper face and/or lower face is arranged in a side-by-side configuration over a width of the trailing edge.

* * * * *